June 25, 1935.     H. HUEBER     2,006,319
DIAPHRAGM VALVE FOR TANK ASSEMBLIES
Filed March 17, 1932
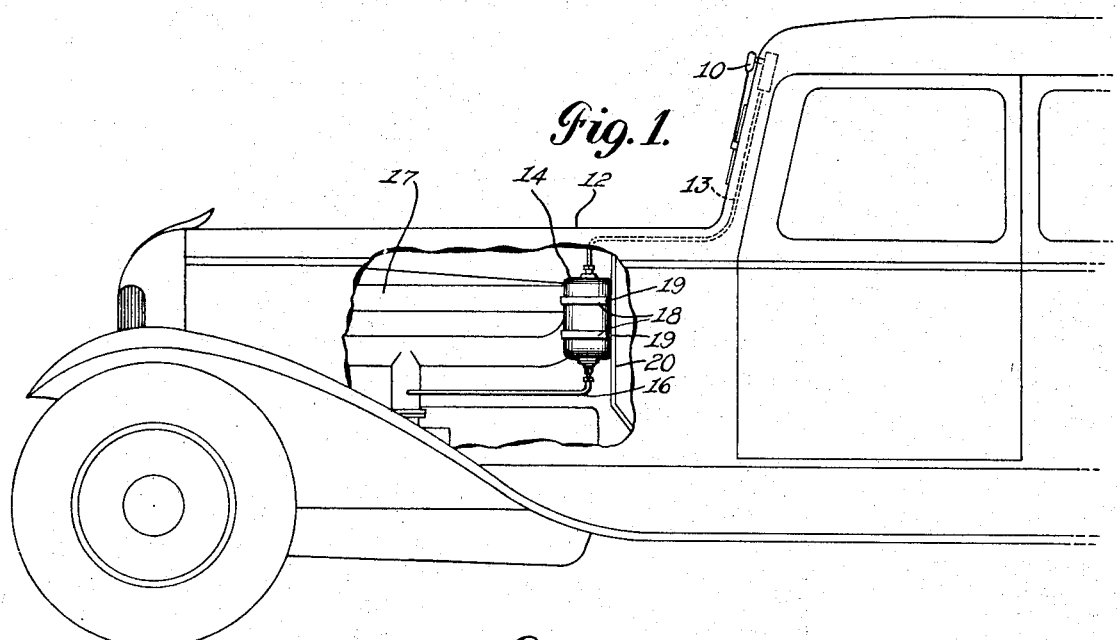
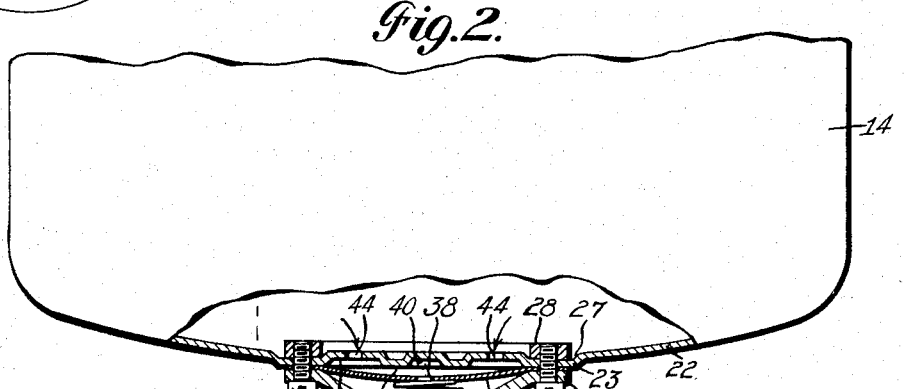
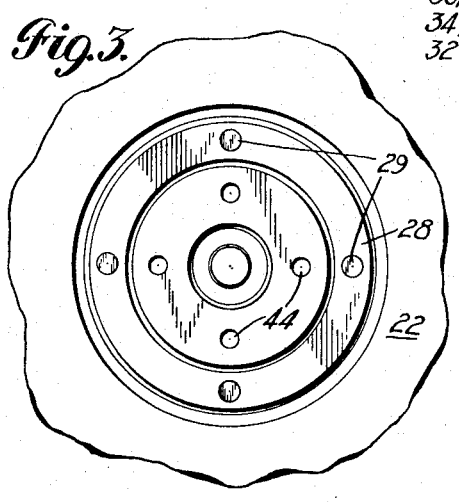
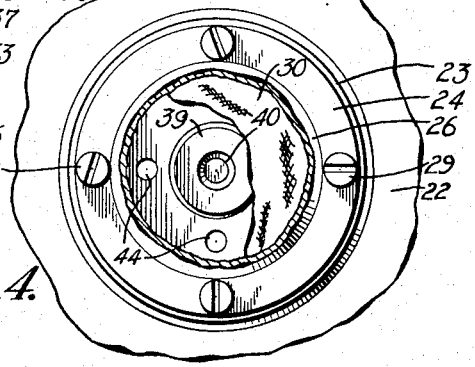
INVENTOR
BY *Henry Hueber,*
*Bean & Brooks.*   ATTORNEYS Patented June 25, 1935

2,006,319

UNITED STATES PATENT OFFICE 2,006,319

DIAPHRAGM VALVE FOR TANK ASSEMBLIES

Henry Hueber, Buffalo, N. Y., assignor to Trico Products Corporation, Buffalo, N. Y.

Application March 17, 1932, Serial No. 599,561

3 Claims. (Cl. 251—119)

This invention relates to diaphragm valves and it has particular relation to valve constructions suitable for facilitating the operation of devices energized by fluid pressure.

The invention is designed particularly for facilitating the operation of windshield cleaners wherein the source of power for operating them is derived from the suction produced by an automobile engine. Since the engine acceleration varies frequently and within wide limits, the force produced by suction likewise varies. For example, when the engine is subjected to a heavy load, or is accelerated rapidly, the section produced is so slight as to operate the windshield cleaner very slowly. It is the purpose of this invention to provide a reserve tank and controlling devices therefor of such construction that sufficient volume of fluid may be exhausted through the suction line from the reserve tank, to provide a considerable uniform and prolonged operation of the windshield motor after the suction force of the engine has been reduced. A controlling valve is provided in this reserve tank which operates automatically to close the line from the tank to the motor as soon as the reduced pressure occurs thus leaving a relatively large fluid volume exhausted from the reserve tank and the partial vacuum thus produced continues to operate the windshield motor. One of the principal features of the invention resides in the construction of a diaphragm valve, together with its mounting, which responds instantly to the changes in pressure and which provides a relatively large area upon which fluid pressure maintains the valve in closed position or opens it.

In the drawing:

Fig. 1 is a diagrammatic elevation of a reserve vacuum tank connected to a suction side of an engine and to the windshield cleaner of an automobile.

Fig. 2 is a fragmentary view, on a larger scale, illustrating a valve mounted in a vacuum tank portions of which are shown in cross section.

Fig. 3 is a fragmentary plan of a valve mounting as viewed from the inside of the vacuum tank; and Fig. 4 is a fragmentary bottom plan view with portions of the valve structure broken away.

In Figure 1 a windshield cleaner 10 is shown mounted in a conventional manner upon an automobile 12 and is provided with a suction tube 13 leading to the top of a vacuum tank 14, and a second tube 16 leading from the bottom of the vacuum tank to an engine 17 of the automobile. The operation of a windshield cleaner by suction produced in the automobile engine is well known and understood and hence a description of the construction of the windshield cleaner and engine is not necessary for a proper understanding of this invention.

Suitable straps 18 surrounding the vacuum tank are provided for securing the tank firmly, as indicated at 19, to a structural member of the automobile. The lower portion of the tank 14 has its wall 22 pressed out to form an outwardly projecting annular support 23 for receiving a marginal flange 24 of a casing 26. The portions of the off-set wall defining the annular support 23 forms an annular recess 27 inside the wall which receives a ring 28. Suitable screws 29 extending through the marginal flange of the casing and screw threaded into the ring 28 confine the edge portion of a diaphragm 30 in fluid tight relation between the casing and the annular support 23. A stem 32 formed integrally with the central portion of the casing receives a gland 33 which is threaded into the outer end of the stem. The tube 16 extends through the gland and is secured thereby in fluid tight relation into the wall of the casing 26. An opening 34 in the stem communicates with the interior of the casing and with a spring seating recess 36 formed in the inner wall of the casing wherein the opening terminates.

One end of a coil spring 37 is seated within the recess 36 and the other end thereof supports a central portion of the diaphragm 30 about an opening 38 in the central portion of the diaphragm. An annular seat 39 pressed out from the wall 22 of the tank is substantially concentric with and inside the annular support 23 and serves to receive the seating portion of the diaphragm in one of its extreme positions. The opening 38 in the diaphragm is aligned with the opening 34 and with a central recess 40 defined by the inner edges of the annular seat 39 but not extending through the wall 22. An annular off-set plane wall portion 42 disposed between the annular support 23 and the seat 39 is provided with a plurality of openings 44 communicating with the interior of the tank and disposed in opposed relation with respect to the diaphragm.

During the operation of the windshield cleaner the degree of suction provided by the motor is made substantially uniform by the operation of the reserve tank 14 and the valve diaphragm 30. The volume of the tank 14 is such that the exhausting of fluid therefrom provides for a reserve suction force being built up therein which continues to function even after the suction is reduced in the engine. Accordingly, there is a suction differential produced on the opposite sides of the diaphragm 30. When the suction is reduced in the tube 16 the pressure is greater upon the lower side of the diaphragm and hence the latter is seated upon the annular seat 39. In this position of the elements the openings 44 still communicate with the annular portion of the diaphragm which bridges the annular space 42 between adjacent edges of the annular support 28 and the annular seat 39. However, communication from the interior of the tank to the tube 16 is arrested. Hence the force provided by the pressure differential is distributed over a relatively large area of the diaphragm which covers the off-set plane portion 42. Thus a substantially maximum closing force is provided which is effective even when the pressure differential is very slight. In this manner a very efficient fluid tight seating of the diaphragm upon the annular seat 39 is insured and the seating pressure is equalized throughout the circumference of the annular seat. Since the recess 40 registers with the opening 38 in the diaphragm there is no possibility of fluid being entrapped inside the annular boundaries of the seat 39 when the diaphragm closes communication between the tank and the tube 16. In view of the fact that a relatively large area of the diaphragm is exposed to pressure when the valve is closed, long life of the diaphragm is insured in addition to the advantages of uniform seating of the valve seat under various conditions of operation.

Although only one form of the invention has been shown and described in detail it will be apparent to those skilled in the art that the invention is not so limited but that various changes may be made therein without departing from the spirit of the invention or from the scope of the appended claims.

What is claimed is:

1. In a reserve tank for providing relatively uniform changes in fluid pressure of a variable fluid pressure system, a casing support pressed out integrally from a wall portion of the tank, a casing secured to said support, an oscillatable valve diaphragm in the casing secured in fluid tight relation between the support and casing, said diaphragm and wall portion having openings offset from each other to provide communication between the tank and the casing, a valve closing seat on said wall portion of the tank within the range of normal operating movement of the diaphragm to close communication between the tank and casing when the diaphragm oscillates in one direction, said openings being disposed on opposite sides of the seat contacting portion of the diaphragm.

2. In a reserve tank to provide relatively uniform changes in the fluid pressure of a variable fluid pressure system, a plurality of offset substantially plane spaced surfaces surrounding a portion of the tank wall and integral therewith, a valve member disposed across the space separating said plane surfaces for movement toward and away from the tank wall, a portion of the tank wall having an opening therethrough between said adjacent offset plane surfaces and communicating with said space, said valve member having an opening therethrough offset from the opening in the tank wall, means for enclosing the plane surfaces and the valve member, the openings in the tank wall and valve member normally communicating with each other, one of the offset plane surfaces constituting a wall seat for arresting communication through the valve opening when the valve is seated whereby the major portion of the valve member is sensitive to differential fluid pressure to maintain it in closed relation upon said seat.

3. A valve construction comprising a container wall of sheet material having an endless pressed out support seat and having a pressed out endless valve seat spaced from the support seat, a casing member having a portion secured upon said support seat to provide a valve chamber with said wall, a diaphragm valve having its edges secured between the casing member and the support seat to partition the valve chamber, said diaphragm having an opening therethrough, said container wall having spaced openings between the support seat and the valve seat for communication with the opening of the diaphragm valve, when the latter is in open position, and means normally urging the diaphragm toward the valve seat to close communication through the valve when differential fluid pressure on the diaphragm valve reaches a predetermined value.

HENRY HUEBER.